(12) United States Patent
Swanson

(10) Patent No.: US 7,443,763 B2
(45) Date of Patent: Oct. 28, 2008

(54) FULL WAVE SEISMIC RECORDING SYSTEM

(75) Inventor: Michael Swanson, Houston, TX (US)

(73) Assignee: Entre Holdings Company, Houston, TX (US)

( * ) Notice: Subject to any disclaimer, the term of this patent is extended or adjusted under 35 U.S.C. 154(b) by 128 days.

(21) Appl. No.: 11/134,003

(22) Filed: May 20, 2005

(65) Prior Publication Data

US 2005/0270901 A1  Dec. 8, 2005

Related U.S. Application Data

(60) Provisional application No. 60/573,223, filed on May 21, 2004.

(51) Int. Cl.
  *G01V 1/38* (2006.01)
(52) U.S. Cl. .......................................... 367/16; 367/19
(58) Field of Classification Search .................. 367/15, 367/16, 19, 173, 153
  See application file for complete search history.

(56) References Cited

U.S. PATENT DOCUMENTS

| | | |
|---|---|---|
| 3,860,900 A | 1/1975 | Scudder |
| 3,886,491 A | 5/1975 | Jonkey et al. |
| 3,903,497 A | 9/1975 | Stimler et al. |
| 3,949,441 A | 4/1976 | Menzel et al. |
| 4,097,837 A | 6/1978 | Cyr |
| 4,300,220 A | 11/1981 | Goff et al. |
| 4,309,763 A | 1/1982 | Passmore et al. |
| 4,388,710 A | 6/1983 | Pecon, Jr. |
| 4,463,451 A | 7/1984 | Warmack et al. |
| 4,513,401 A | 4/1985 | Ottsen et al. |
| 4,663,744 A | 5/1987 | Russell et al. |
| 4,942,557 A | 7/1990 | Seriff |
| 5,022,012 A * | 6/1991 | Godfrey et al. ............... 367/3 |
| 5,052,814 A | 10/1991 | Stubblefield |
| 5,077,696 A | 12/1991 | McEachern et al. |
| 5,113,377 A | 5/1992 | Johnson |
| 5,117,396 A | 5/1992 | Castile et al. |
| 5,119,341 A | 6/1992 | Youngberg |
| 5,184,328 A | 2/1993 | Dumestre, III |

(Continued)

FOREIGN PATENT DOCUMENTS

EP  0074709  3/1983

(Continued)

OTHER PUBLICATIONS

PCT/US05/17930, Search Report and Written Opinion of the International Searching Authority dated Dec. 18, 2006.

(Continued)

*Primary Examiner*—Mark Hellner
(74) *Attorney, Agent, or Firm*—Baker & McKenzie LLP

(57) ABSTRACT

The present disclosure generally relates to systems and methods for acquiring seismic data. In one exemplary embodiment, a method for acquiring seismic data is described in which recorder instruments are deployed to the seafloor and utilized for recording pressure wave and shear wave data. An acoustic array, displaced from the seafloor, is also provided for sending acoustic signals to the instruments on the seafloor. The orientation of the instruments on the seafloor is determined via acoustic communication between the acoustic array and the instruments. Related systems and methods for acquiring seismic data are also described.

26 Claims, 10 Drawing Sheets

U.S. PATENT DOCUMENTS 5,497,356 A     3/1996    Norton, Jr. et al.
6,005,828 A * 12/1999   Carroll et al. ................. 367/19
6,430,105 B1    8/2002    Stephen

FOREIGN PATENT DOCUMENTS

| | | |
|---|---|---|
| EP | 0182452 | 5/1986 |
| GB | 2332946 | 7/1999 |
| WO | WO 83/02515 | 7/1983 |
| WO | WO 94/19707 | 9/1994 |
| WO | WO 96/25726 | 8/1996 |
| WO | WO 99/35513 | 7/1999 |
| WO | WO 02/063332 A1 | 8/2002 |

OTHER PUBLICATIONS

PCT International Search Report dated Apr. 21, 1999, PCT/GB98/03921.

UK Search Report dated Jul. 29, 1998, GB 9800042.5.

* cited by examiner

FULL WAVE SEISMIC RECORDING SYSTEM

CROSS-REFERENCE TO RELATED APPLICATIONS

This application claims the benefit of U.S. Provisional Application No. 60/573,223, filed on May 21, 2004. U.S. Provisional Application No. 60/573,223 is commonly assigned with the present application and is hereby incorporated by reference for all purposes.

TECHNICAL FIELD

The present disclosure generally relates to seismic recording devices and systems, and methods for acquiring and conditioning seismic data.

BACKGROUND

Seismic data, such as pressure (P) wave and shear (S) wave data, is often used to model geological formations lying beneath the seafloor. Seismic data is particularly useful in the offshore energy industry to gain a better understanding of potential drill sites. For example, seismic data can be used to determine the existence of a fossil fuel reservoir, and whether such reservoir is capable of trapping such fuels by the existence of stratigraphic "traps" which prevent upward loss of the fluids.

Various techniques and associated instrumentation have been developed to acquire, or record, seismic data. One such marine technique comprises the use of streamers, which are recording devices that are towed behind a sea vessel. In practice, a source-firing event is used to create P-waves, which reflect off the geologic formations beneath the seafloor and back to the towed streamers. However, towed streamers are generally submerged a short distance from the sea surface, and therefore, are unable to record S-waves, which are unable to travel through seawater. Also, towed streamers are very vulnerable to damage, expensive and have numerous quality issues, such as induced noise from towing, and data degradation caused by mobile receiver points. Still further, towed streamers are linear in arrangement and, therefore, fail to provide sufficient samplings for gaining a true three-dimensional (3D) image of the targeted geologic formation.

Seafloor recording systems have been developed to overcome some of the problems associated with towed streamers. For example, ocean bottom cable, or OBC, systems have been used to gather seismic data. These systems generally utilize a cabled connection between seafloor recorders and a static control vessel on the sea surface. OBC systems improved the acquisition of seismic data by enabling the recording of S-wave data. However, such systems have been found to be unreliable because of the need to deploy and recover the cables on a daily basis, thereby increasing the likelihood of seawater ingress. Also, OBC systems, as with the towed streamers, are linear in arrangement and, therefore, fail to provide sufficient samplings for gaining a true 3-D image of the targeted geologic formation.

The inadequacies associated with towed streamers and OBC systems have lead to the development of ocean bottom seismic, or OBS, systems. OBS systems utilize seafloor recorders, which, unlike OBC recorders, are not cabled to the control vessel when deployed. Current OBS systems are excessively expensive and inefficient, which calls the commercial viability of such systems into question. For example, current OBS systems are unable to determine the heading (orientation) of the seafloor recorders without the use of a remote operated vehicle (ROV). Indeed, an ROV must be deployed for each seafloor recorder to determine the orientation of each seafloor recorder. As can be appreciated, the deployment and operation of an ROV for each seafloor recorder greatly increases the costs and time associated with gathering seismic data. In turn, the inefficiencies surrounding the use of ROVs prohibit the deployment of a sizable number of seafloor recorders. Consequently, current OBS systems do not provide sufficient data samplings for gaining a true 3-D image of the targeted geologic formation.

BRIEF SUMMARY

The present disclosure generally relates to systems and methods for acquiring seismic data. In one exemplary embodiment, a method for acquiring seismic data is described in which recorder instruments are deployed to the seafloor and utilized for recording P-wave and S-wave data. An acoustic array, displaced from the seafloor, is also provided for sending acoustic signals to the instruments on the seafloor. The orientation of the instruments on the seafloor is determined via acoustic communication between the acoustic array and the instruments. Related systems and methods for acquiring and conditioning seismic data are also described.

An individual seafloor recorder instrument is also described. In one embodiment, the recorder instrument includes a housing having various seismic sensors disposed therein. The instrument further includes transponders spaced from one another along the housing to enable acoustic communication between the instrument and an acoustic array displaced from the seafloor. A frame assembly may also be provided for facilitating deployment of the instrument and proper positioning of the instrument on the seafloor.

BRIEF DESCRIPTION OF THE DRAWINGS

Reference is now made to the following descriptions taken in conjunction with the accompanying drawings.

DETAILED DESCRIPTION

Various aspects of full wave seismic recording systems and methods according to the present disclosure are described. It is to be understood, however, that the following explanation is merely exemplary in describing the systems and methods of the present disclosure. Accordingly, several modifications, changes and substitutions are contemplated.

Figure 1:
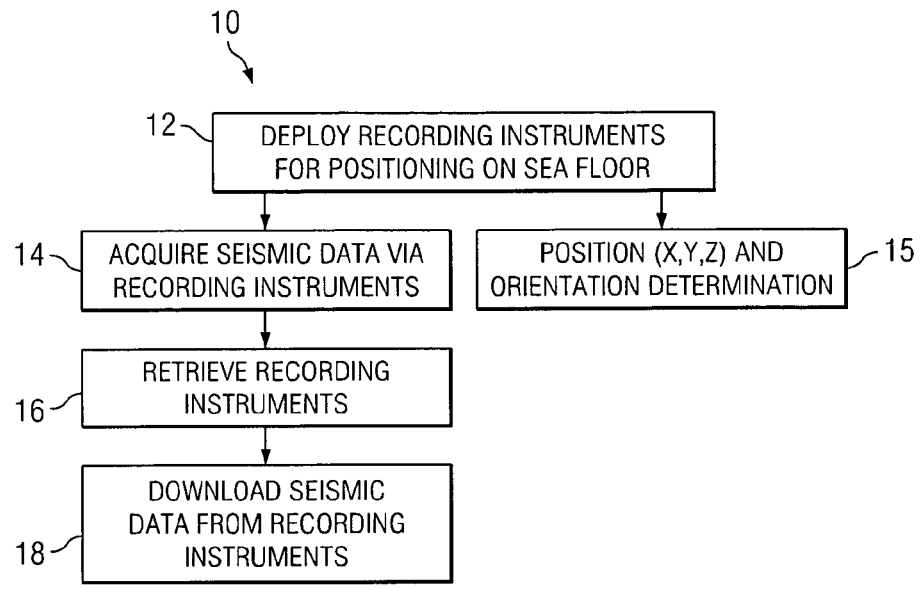
FIG. 1 illustrates a block diagram of one embodiment of a seismic data acquisition process according to the present disclosure.

FIG. 1 illustrates a block diagram 10 depicting general steps for acquiring seismic data according to the present disclosure. In one embodiment, the seismic data acquisition process begins with the deployment of seafloor recording instruments to the seafloor 12. Once positioned on the seafloor, the recording instruments acquire seismic data via recorder devices 14 to be described. Also, the position (expressed in x, y, z coordinates) and orientation of the instruments 15 on the seafloor is determined according to processes to be described. After acquisition of seismic data, the recording instruments are retrieved from the seafloor 16 and the acquired data is downloaded from the recording instruments 18.

Figure 2:
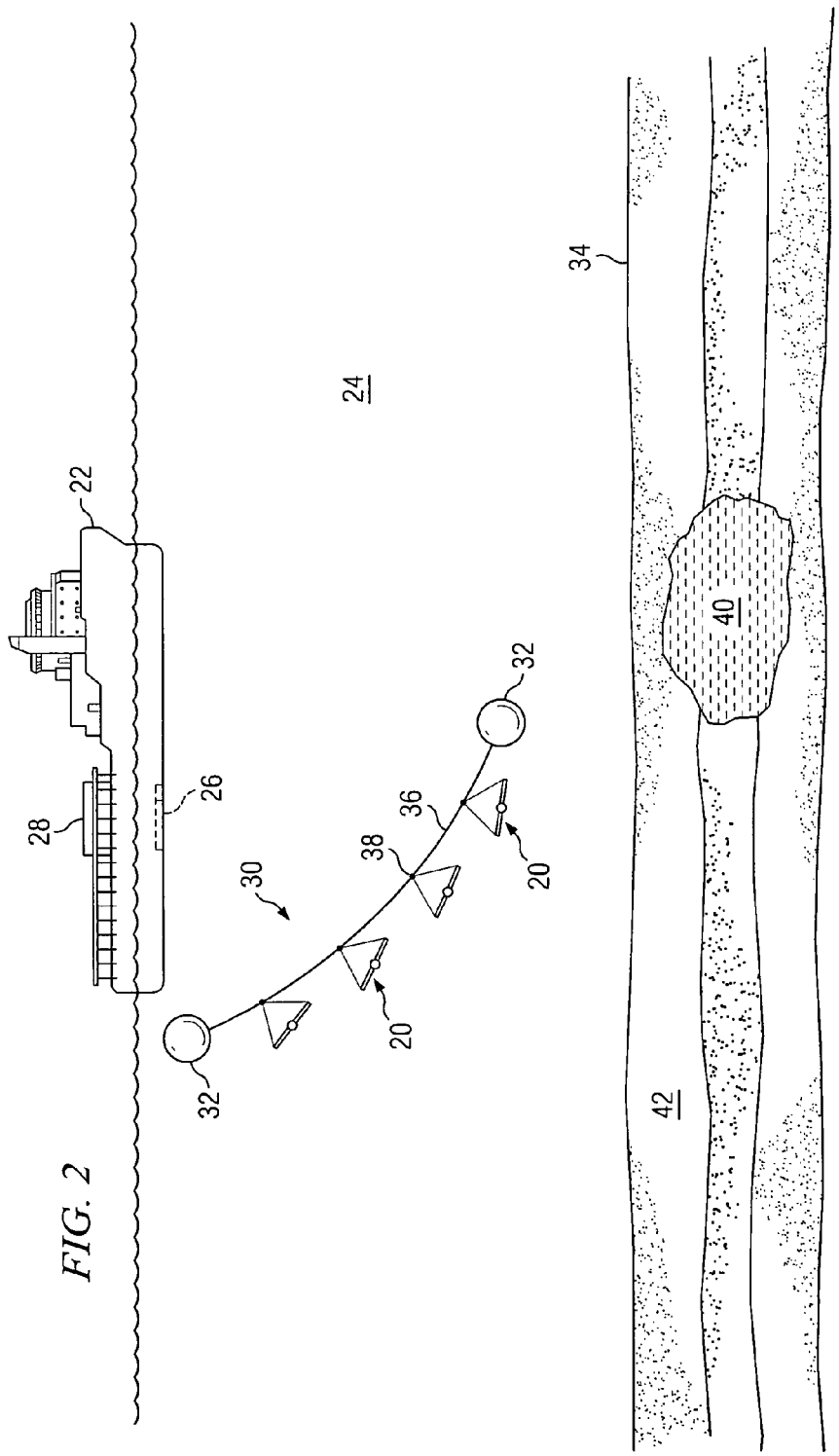
FIG. 2 illustrates a schematic view of one embodiment of a control vessel and the deployment of seafloor recorder instruments from the control vessel.

Referring to FIG. 2, a plurality of seafloor recorder instruments 20 may be deployed for operation from a control vessel 22. The control vessel 22 generally comprises a seaworthy vessel at the surface of a body of water 24, such as an ocean, sea or lake. The control vessel 22 includes various devices to facilitate acquisition of seismic data, such as an acoustic array 26, and various compartments for facilitating the retrieval of seismic data, such as a recording compartment 28. These devices and compartments will be described in greater detail later in the application.

The recording instruments 20 may be deployed as part of an instrument line 30 having a pair of release transponders 32 disposed at opposing ends of the instrument line 30. In a general sense, the release transponders 32 are suitable for facilitating deployment of the instrument line 30 to a subsea surface, e.g. seafloor 34, while also facilitating retrieval of the instrument line after acquisition of seismic data. In this regard, the release transponders 32 are adapted to receive an acoustic signal, which effects dispatch of the release transponders 32, and therefore the instrument line 30, from the seafloor to the sea surface. In practice, the release transponders 32 may be associated with heavy sand bags to facilitate deployment to the seafloor 34. Once dispatched from the seafloor 34, the release transponders 32 leave behind the sand bags, which may be biodegradable sand bags filled with unobtrusive weighting material (e.g. silt similar in kind to the seafloor material) to reduce any harmful environmental effects. The release transponders 32 and the instruments 20 may be operatively connected via a tether line 36, which is connected to each release transponder and passes through suitable connection mechanisms, such as swivel clamps 38, associated with the instruments. In some embodiments, only one release transponder 32 may be associated with the instrument line 30. Also, several instrument lines 30 may be deployed to increase the amount of seismic data ultimately retrieved as will be further described. Still further, the number of instruments 20 associated with each instrument line 30 may vary.

The instrument line 30 is typically dispatched to gather seismic data on geological formations disposed beneath the seafloor 34. For example, it may be desirable to visualize the shape and positioning of a fossil fuel reservoir 40 disposed within rock formations 42 underneath the seafloor 34. Seismic data facilitates modeling of these structures, and therefore, may be used to give oil and gas explorationists a better appreciation of where to drill to achieve maximum efficiency.

Figure 3:
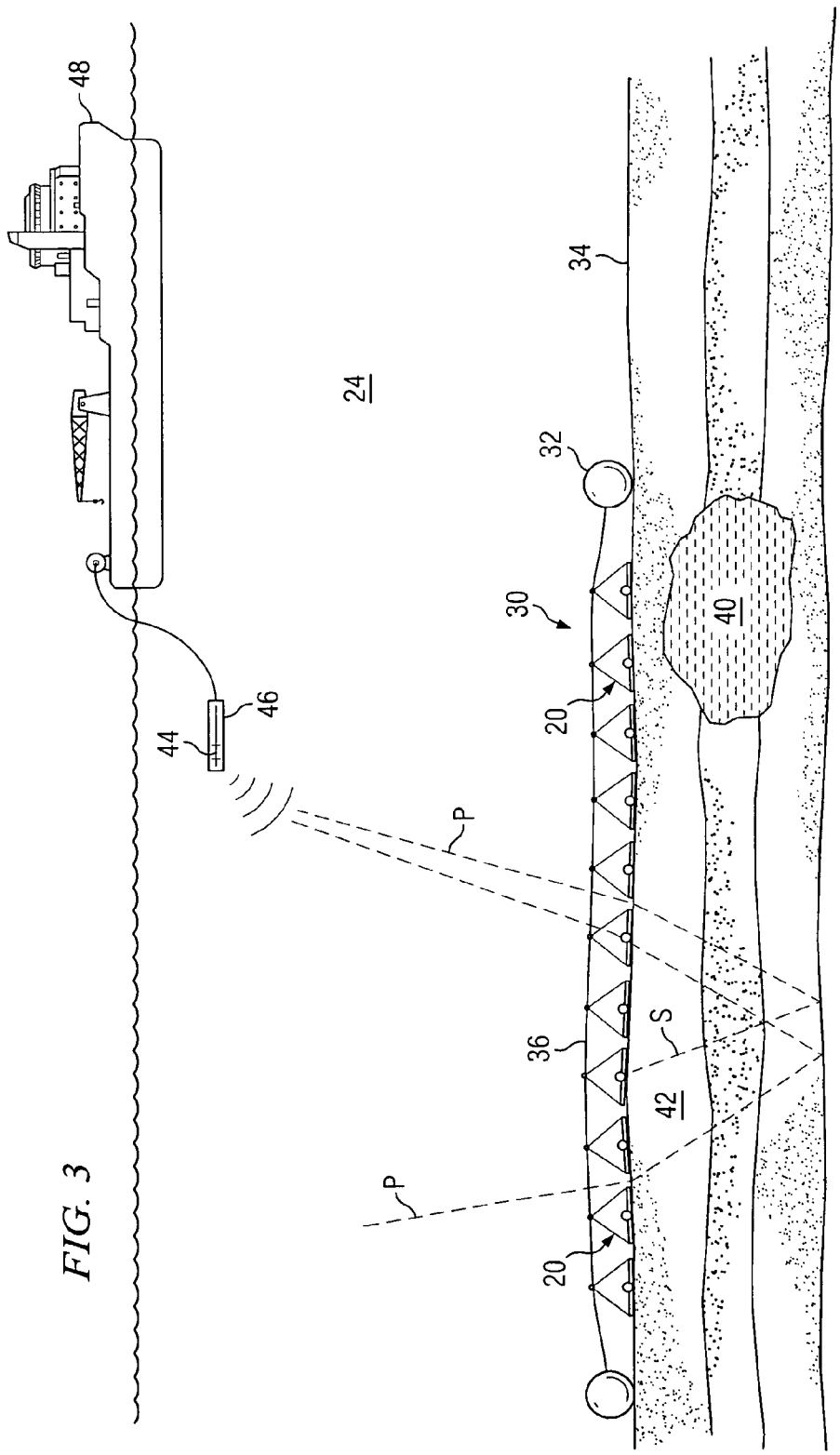
FIG. 3 illustrates a schematic view of one embodiment of a source firing event for generating pressure waves.

Referring to FIG. 3, once the instrument line 30 is disposed on the seafloor 34, the instruments 20 may be used to gather seismic data. Generation of seismic data is facilitated by a source-firing event, which, in one example, is carried out by the firing of pneumatic air guns 44. The pneumatic air guns 44 may form a portion of a pneumatic air gun assembly 46, which is towed behind a source vessel 48. As with the control vessel 22, the source vessel 48 generally comprises a seaworthy vessel on the surface of the sea 24. Indeed, in some embodiments, the control vessel 22 and source vessel 48 may be a single vessel. In practice, the pneumatic air gun assembly 46 is towed in the general vicinity of the instrument line 30 and the pneumatic air guns 44 are fired to produce pressure waves. The pressure waves travel from the pneumatic guns 44 to and through the seafloor 34 and reflect off of geologic formations beneath the seafloor and back to the seafloor where they are measured by the instruments 20 of the instrument line 30. Being on the seafloor 34, the instruments 20 are also able to measure shear waves which are created by conversion of the pressure waves into shear waves, and which also reflect back from subsurface features.

Figure 4:
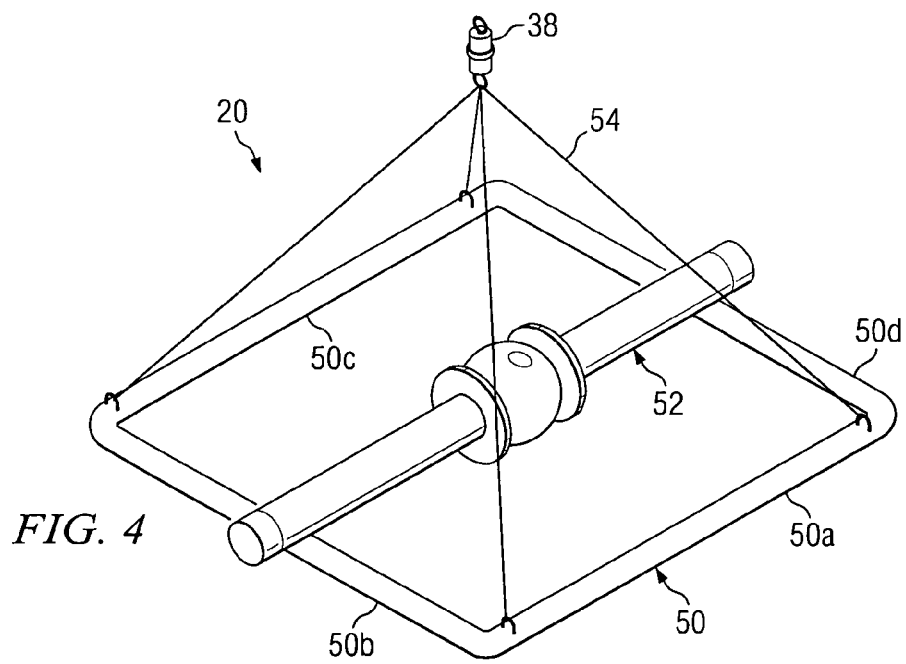
FIG. 4 illustrates an isometric view of one embodiment of a seafloor recorder instrument.
Figure 5:
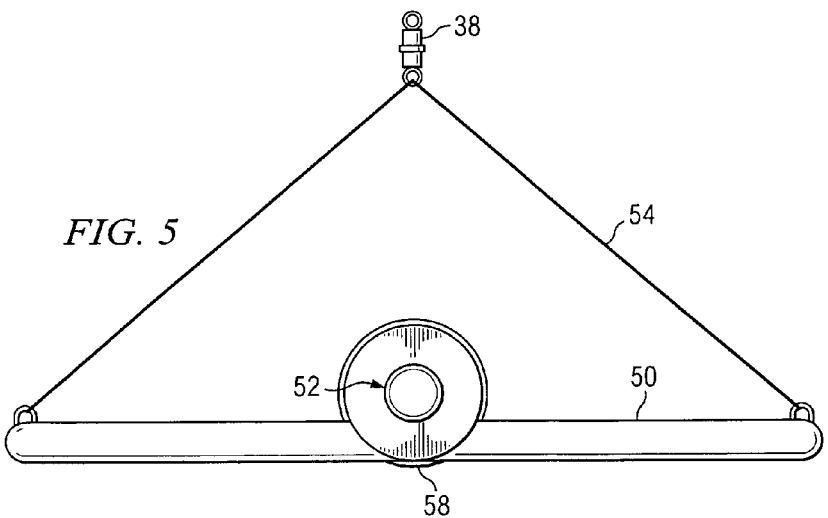
FIG. 5 illustrates an end elevational view of one embodiment of the seafloor recorder instrument of FIG. 4.

Having described an exemplary method for acquiring seismic data according to the present disclosure, attention will now be given to specific examples of instrumentation and methodology that may be used for acquiring seismic data. Referring to FIGS. 4 and 5, the instrument 20 is shown in more detail to include a lifting frame 50 disposed about an instrument housing 52 and a lifting harness 54, which extends from the lifting frame and terminates at the swivel clamp 38. The lifting frame 50 is generally tubular in shape and may comprise four members 50a, 50b, 50c, 50d, which are integrally formed or connected together in any suitable manner, including a molded connection. Although shown as substantially square-shaped in plan, the lifting frame 50 may take on a variety of geometrical shapes, including circular or other rectilinear shapes. The lifting frame 50 provides a uniform weight distribution for the instrument 20, thereby providing a stable and level deployment orientation as the instrument descends through the water column, generally defined between the sea surface and the seafloor. In addition, the cylindrical design of the lifting frame 50 facilitates low water resistance. Of course, other low resistance designs are contemplated having other geometrical configurations. The lifting frame 50 may be formed of a variety of materials to achieve large pressure strength. For example, the lifting frame may be formed of an isoplast material, which is a carbon fiber reinforced polyurethane (PU) compound. The lifting frame 50 in combination with the lifting harness 54 further provides an inherent stability moment sufficient to maintain an "always up" orientation. In one example, the stability moment may be approximately 1680 Lbs where the suspended height of the lifting frame 50 is approximately 3 feet and the instrument 20 is approximately 56 lbs in weight. As can be appreciated, the low center of gravity of the instrument 20 minimizes seafloor current interference and turbulence, thereby ensuring seafloor stability. Also, the lifting frame 50 may be configured to store extra batteries for powering of internal instrument housing electronics that will be further described. In this regard, the lifting frame 50 may be capable of receiving and storing 'M' cell Nickel Metal Hydride (NiMH) battery packs (not shown), which can substantially extend the recording time of the instrument 20. Power from the stored batteries can be fed to the instrument housing 52 via a bulkhead connector and flylead. Alternatively, or in conjunction with the battery packs, void space in the lifting frame 50 may be filled with dense packing material to maintain the weight of the instrument 20 as greater than water.

The lifting harness 54 may be formed of a variety of materials, such as nylon rope. In the illustrated embodiment, the lifting harness 54 is connected to the four corners of the lifting frame 50 to provide stability to the instrument 20 as the instrument descends through the water column. The lifting harness 54 is connected to the swivel clamp 38 to create a lifting or pivot point. The tether line (not depicted) also passes through the swivel clamp 38 to operatively connect the instrument 20 to the other instruments on the instrument line 30.

Figure 6:
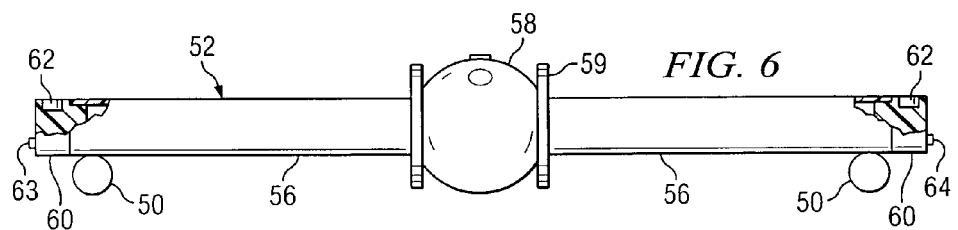
FIG. 6 is a partial sectional side view of one embodiment of the seafloor recorder instrument of FIG. 4.

Referring to FIG. 6, the instrument housing 52 is provided to house various internal instrument electronics and generally includes a pair of instrument tubes 56 operatively connected to a central housing 58. The central housing 58 may be domed in shape to facilitate semi-burial into soft sediments on the seafloor 34 as will be described. In one embodiment, the instrument tubes 56 are pressure fit into flanged ends 59 of the central housing 58 and further secured via through bolts (not shown). The central housing 58 includes openings corresponding to the instrument tubes 56 to facilitate communication from the instrument tubes into the central housing for reasons to be described. In one embodiment, the instrument tubes 56 are mounted into a molded crevice on top of the lifting frame 50, thereby facilitating substantially identical orientation between units 20, while minimizing lifting strains. As with the lifting frame 50, the instrument tubes 56 and the central housing 58 may be formed of an isoplast material.

End caps 60 are disposed at opposing ends of the instrument housing 52 and are molded into the distal ends of the instrument tubes 56 to prevent seawater ingress and to facilitate low cost acoustic mounts while eliminating bulkhead connectors. The end caps 60 comprise acoustic transponders 62, which in one example, may be molded directly into the end caps to enhance seawater coupling. The acoustic transponders 62 are generally formed of ceramics and are adapted for acoustic communication with an external acoustic array (e.g. acoustic array 26 in FIG. 2) as will be further described. In some embodiments, the transponders 62 are able to both receive and transmit acoustic communication, while in other embodiments, both transponders are able to transmit acoustic communication while only one of the transponders is able to receive acoustic communication.

In the illustrated embodiment, the left end cap 60 may be provided with a preset pressure relief valve 63, which enables battery-generated gases to escape when the instrument 20 is recovered from the seafloor 34. On the other side, the right end cap 60 may be provided with a flushing port 64 to allow flushing of the inside of the instrument housing 52 with nitrogen gas prior to deployment of the instrument 20. Flushing with nitrogen gas removes oxygen from the instrument housing 52, thereby reducing or preventing any risk of explosion associated with the build up of hydrogen gas. Also, the gas flush removes any moisture that could condense on the interior electronics and cause corrosion or electrical shorting.

Figure 7:
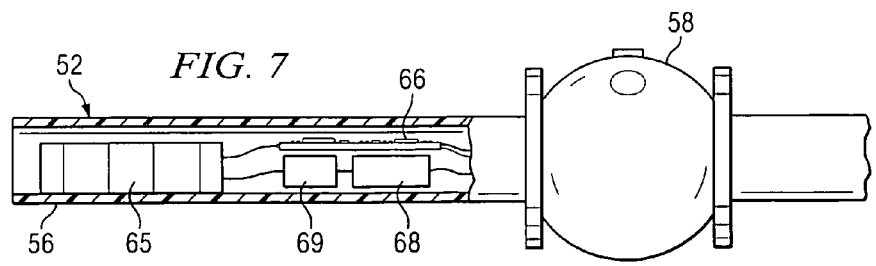
FIG. 7 is a schematic view of a portion of one embodiment of a housing of the seafloor recorder instrument of FIG. 4.

Referring to FIG. 7, the left instrument tube 56 (as viewed in FIG. 7) includes a battery pack 65, control electronics 66 and a discrete recording underwater machine, or DRUM recorder, 68. The battery pack 64 may be a NiMH battery pack, which is operatively connected to electronics within the instrument housing 52, including the control electronics 66 and the recorder 68. The control electronics 66 generally provide operating and communicating functionality between the various components of the instrument housing 52. In one example, the control electronics may include a low power CPU board with built-in Ethernet, USB, SDRAM, UART channels, a real time clock, 48 channel programmable interrupt controller, a 16 channel DMA controller, compact drive and microdrive hot swap type II sockets, a 4+ Gbyte compact flash card, a temperature and pressure sensor, and an auxiliary interface for an extra sensor. The recorder 68 generally receives data from analog recording sensors disposed in the central housing 58, digitizes this data, and transfers this data to a memory device 69 disposed in the instrument housing 52. According to one embodiment, the memory device 69 may take the form of solid state memory disks capable of storing a large amount of seismic data. In one embodiment, the recorder 68 is a 24-bit delta sigma 4 channel recorder equipped with an A2D (Analog to Digital) 4 channel converter.

Figure 8:
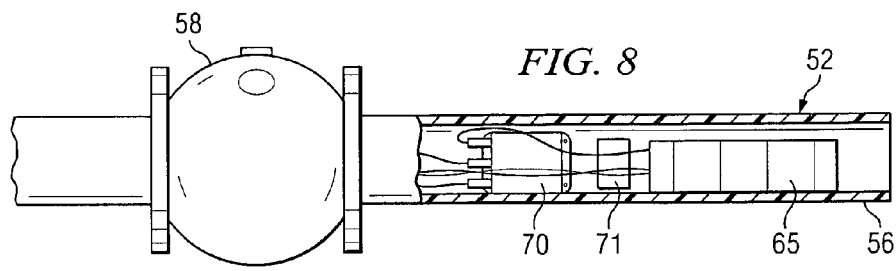
FIG. 8 is a schematic view of another portion of the housing of one embodiment of the seafloor recorder instrument of FIG. 4.

Referring to FIG. 8, the right instrument tube 56 includes another battery pack 65 and an acoustics controller 70 for generally facilitating communication between the acoustic transponders 62 and an external acoustic array (e.g. acoustic array 26 in FIG. 2). The battery pack 65 again may be a NiMH battery pack, which is operatively connected to electronics within the instrument housing 52, including the acoustics controller 70. The right instrument tube 56 may also include an RFID tag 71, which provides the instrument 20 with a particular ID that can be scanned once the instrument is retrieved from the seafloor 34. In this manner, the instruments 20 can be differentiated from one another.

As discussed above, the instrument tubes 56 and the central housing 58 are open to one another to permit communication between the instrument electronics and seismic sensors disposed within the central housing. In particular, and with reference to FIG. 9, the central housing 58 in one embodiment includes three geophones 72 operatively secured to a base plate 74 and a hydrophone 76 operatively secured with the central housing. In this manner, the instrument 20 can be considered to utilize four-component (4C) technology, which permits recording of both pressure and shear wave (collectively, full wave) seismic data. In one embodiment, the geophones 72 and hydrophone 76 are analog sensors configured to receive seismic data and communicate this seismic data to the recorder 68. However, in other embodiments, the geophones 72 and hydrophone 76 may themselves be digital sensors.

Figure 10:
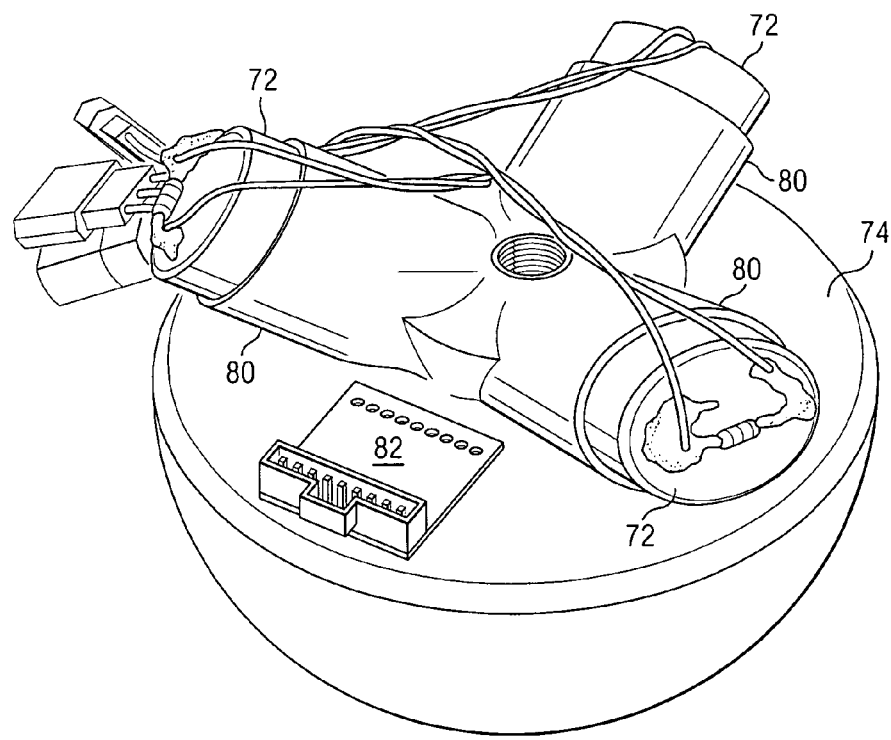
FIG. 10 is an isometric view of a base plate of the housing of one embodiment of the seafloor recorder instrument of FIG. 4.

Referring to FIG. 10, the geophones 72 may be omnidirectional capable and arranged in a manner to achieve seismic frequency recording from substantially all angles. In one example, the geophones each have a vertical inclination of 54.7 degrees and are oriented at 120 degrees with respect to each other, also referred to as a Galperin arrangement. Of course, other suitable arrangements are contemplated. Each geophone 72 may be disposed in a corresponding molded receptacle 80 extending from the base plate 74. The molded receptacles 80 may be integrally formed with the base plate 74, and in practice, may be injection-molded as one piece.

Figure 9:
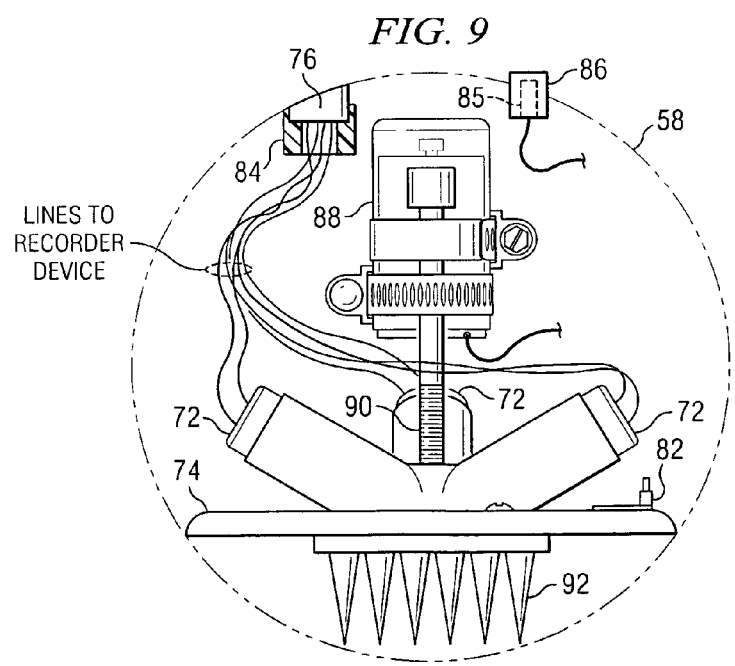
FIG. 9 is a schematic view of another portion of the housing of one embodiment of the seafloor recorder instrument of FIG. 4.

Referring to FIGS. 9 and 10, the base plate 74 further includes an inclinometer 82, which may be fixed into the base plate in a molded connection. In this manner, the inclinometer 82 can maintain its inherent level of accuracy via a once-only calibration. In one embodiment, the inclinometer is a dual axis MEMS technology inclinometer having a 0.1-degree resolution. The inclinometer 82 generally determines the inclination, or tilt, of the instrument 20 relative to a horizontal plane, thereby facilitating signal conditioning after downloading of the seismic data. For example, if the instrument 20 is deployed to an uneven position on the seafloor 34, the inclinometer can record tilt values to properly adjust the seismic data extracted from the instrument 20. The tilt of the instrument 20 is generally calculated along two axes, often referred to as "pitch" and "roll." By determining the pitch and roll values, the recorded seismic data values can be subsequently re-oriented relative to a horizontal plane.

The inclinometer 82 may also function as an intelligent switch for the recording process. In this regard, the recorder 68 (FIG. 7) may be activated only after the tilt values measured by the inclinometer 82 remain unchanged for a selected period, thereby indicating a stable condition on the seafloor. Accordingly, the power and memory usage of the instrument 20 can be conserved during prolonged periods on the control vessel or while sinking to the seafloor at great depths. In practice, the microprocessor within the control electronics 66 (FIG. 7) monitors the tilt values to determine whether or not they are changing. Once the microprocessor determines the tilt values to be unchanged for a certain period of time, the microprocessor will instruct the recorder 68 to begin recording. Otherwise, the recorder 68 remains in standby mode, thereby conserving power and memory.

Referring again to FIG. 9, the hydrophone 76 is embedded into the central housing 58, yet in communication with the open seawater to facilitate seismic data recording. In one example, the hydrophone 76 is secured to a molded coupling 84 defined in the central housing 58. The recessed arrangement of the hydrophone 76 enhances the waterproof integrity of the hydrophone, while reducing exposure of the hydrophone to physical damage.

The central housing 58 further includes a data port 85, which is operatively connected to the memory device 69 to allow extraction of the recorded seismic data from the instrument 20. The data port 85 may take the form of a 16-pin bulkhead connector, which includes an Ethernet functionality to facilitate data download. In addition, the data port 85 includes additional functionality beyond data extraction. For example, the functions enabled through the data port 85 may include an RS 232 functionality for configuring the recorder, conducting instrument electronics tests and providing firmware upgrades. Also, the various battery packs 65 disposed within the instrument housing and the lifting frame can be charged via the data port 85. Still further, the start status of the system can be initiated through the data port 85 using an RS 422 functionality. The start status generally provides for the detection of an external timing signal when the instrument 20 is onboard the control vessel. The timing signal may be an IRIG-B signal, which synchronizes the timing of the instrument 20 with an external global positioning system (GPS) time as will be further described. On removal of this signal, the microprocessor within the instrument 20 switches the system clock to internal timing. In this manner, the internal clock can correspond with the GPS time in an accurate manner, such as to better than 4 nanoseconds. The data port 85 also facilitates a determination of the time drift of the internal clock. Still further, the data port 85 provides system reset functionality. A watertight plug 86 may be provided to protect the data port 85 during deployment.

The central housing 58 further may include an eccentric motor 88, which is secured to the base plate 74 via a connector 90, such as a bolt. In some embodiments, the motor 88 is provided to activate a set of spikes 92 extending from the base plate 74. When activated, the spikes 92 improve coupling of the instrument 20 with the sediments of the seafloor 34. In this regard, a lower portion of the central housing 58 may be removable to facilitate exposure of the spikes to the seafloor 34. In one embodiment, the motor 88 may be started once the instrument 20 stabilizes via communication with the microprocessor. For example, once the microprocessor determines the instrument 20 to be stabilized (by determining that the tilt values of the inclinometer are no longer changing), the microprocessor can signal the motor 88 to activate the spikes 92 for a certain amount of time.

As discussed above with reference to FIG. 6, the instrument 20 includes a pair of acoustic transponders 62 for facilitating acoustic communication between the instrument 20 and an external acoustic array, such as the acoustic array 26 (FIG. 2). In particular, the orientation of the instrument 20 relative to a geographic reference, such as true north, can be determined via acoustic communication between the instrument 20 and the acoustic array 26. The orientation, or heading, of the instrument 20 is used to maintain a low vector fidelity degradation value for the processed seismic data, thereby ensuring accuracy of the recorded seismic data. In this regard, errors in orientation correspond to errors in seismic signal strength, thus negatively impacting the accuracy of the recorded seismic data. For example, a 2-degree error in orientation can translate into a 20 dB error in signal. It is to be appreciated, therefore, that the accuracy of the seismic data depends, in part, on the accuracy of the orientation determination.

Figure 11:
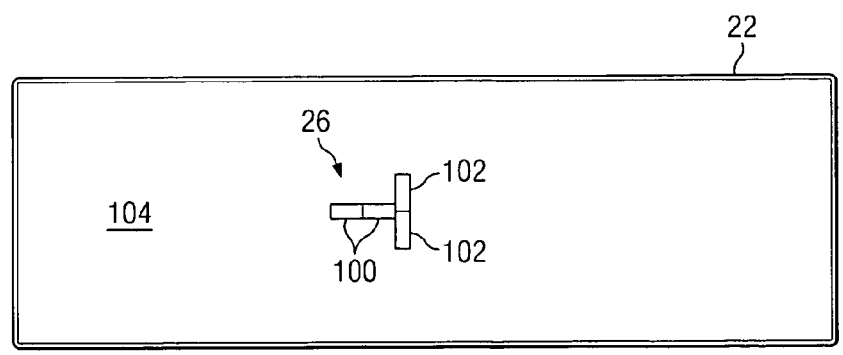
FIG. 11 is a bottom view of one embodiment of a hull of a control vessel having an acoustic array disposed therein.
Figure 12:
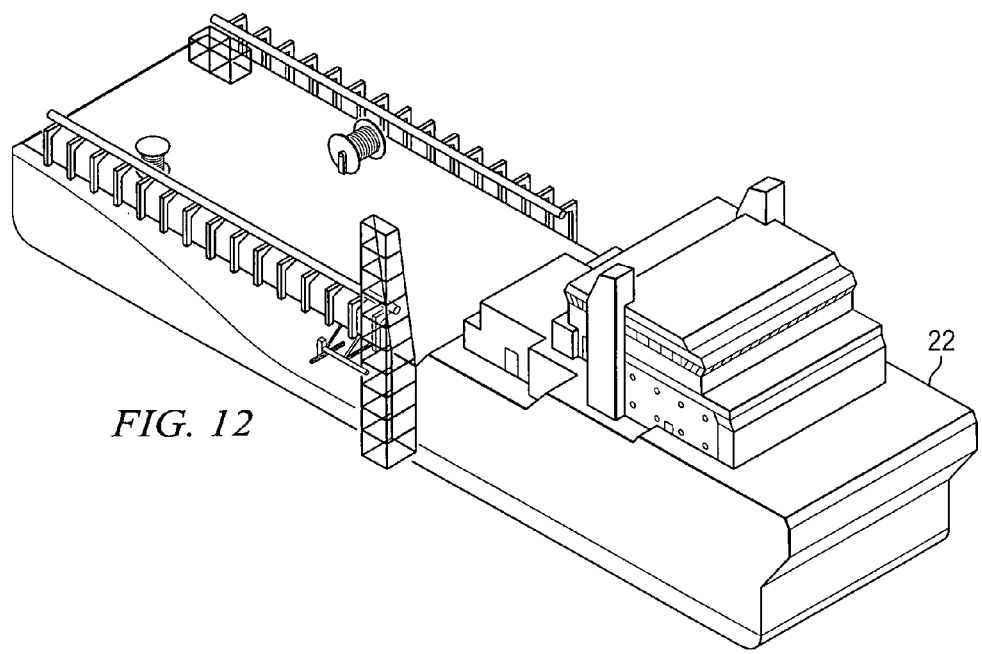
FIG. 12 is an isometric view of one embodiment of a hull of a control vessel having an acoustic array operatively connected thereto.

Location of the instrument 20 on the seafloor, and also monitoring through the water column, may be expressed in x, y and z coordinates relative to the x, y, and z coordinates of the acoustic array 26, and further the orientation of the instrument 20 is measurable in degrees, relative to the heading (orientation) of the array 26. Accordingly, in one example and with reference to FIG. 11, the acoustic array 26 is generally T-shaped to include two y-axis transponder elements 100 and two x-axis transponder elements 102. Each of the transponder elements 100, 102 may include 128 transmitters and 64 receivers configured to communicate with the transponders 62 on the instrument 20. Of course, other suitable arrangements are contemplated for the acoustic array 26, such as varying numbers of transponder elements 100, 102 and associated transmitter/receiver combinations. Also, additional geometric configurations, such as an L-shape or other orthogonal shapes, other than the illustrated T-shape are contemplated so long as the orientation of the instrument 20 can be determined relative to the acoustic array 26. In practice, the acoustic array 26 may be recessed into the hull of the control vessel 22 to lie flush with a bottom surface 104 of the hull. In this embodiment, the hull is generally planar in shape in the region associated with the acoustic array 26. By mounting the acoustic array 26 flush with the hull, the acoustics are able to subtend a large arc of coverage (e.g. 60 degrees to either side of the vertical). Moreover, corrections for movement of the control vessel 22 are minimized as the real time motion sensors mounted inside the hull (not shown) lie directly above the acoustic array 26. Also, the acoustic array 26 may include an inclinometer (not shown) to further remove the effects of vessel movement on the determined x, y and z coordinates of the acoustic array. In other embodiments, the acoustic array 26 may form a portion of another sea vessel other than the control vessel 22. Still further, the acoustic array 26 may be positioned to the side of the control vessel 22 as illustrated in FIG. 12. In this embodiment, the acoustic array 26 is operatively connected to a tower member 106 disposed at the side of the hull. In practice, the acoustic array 26 may be lowered into the water to communicate with the instrument 20.

Figure 13:
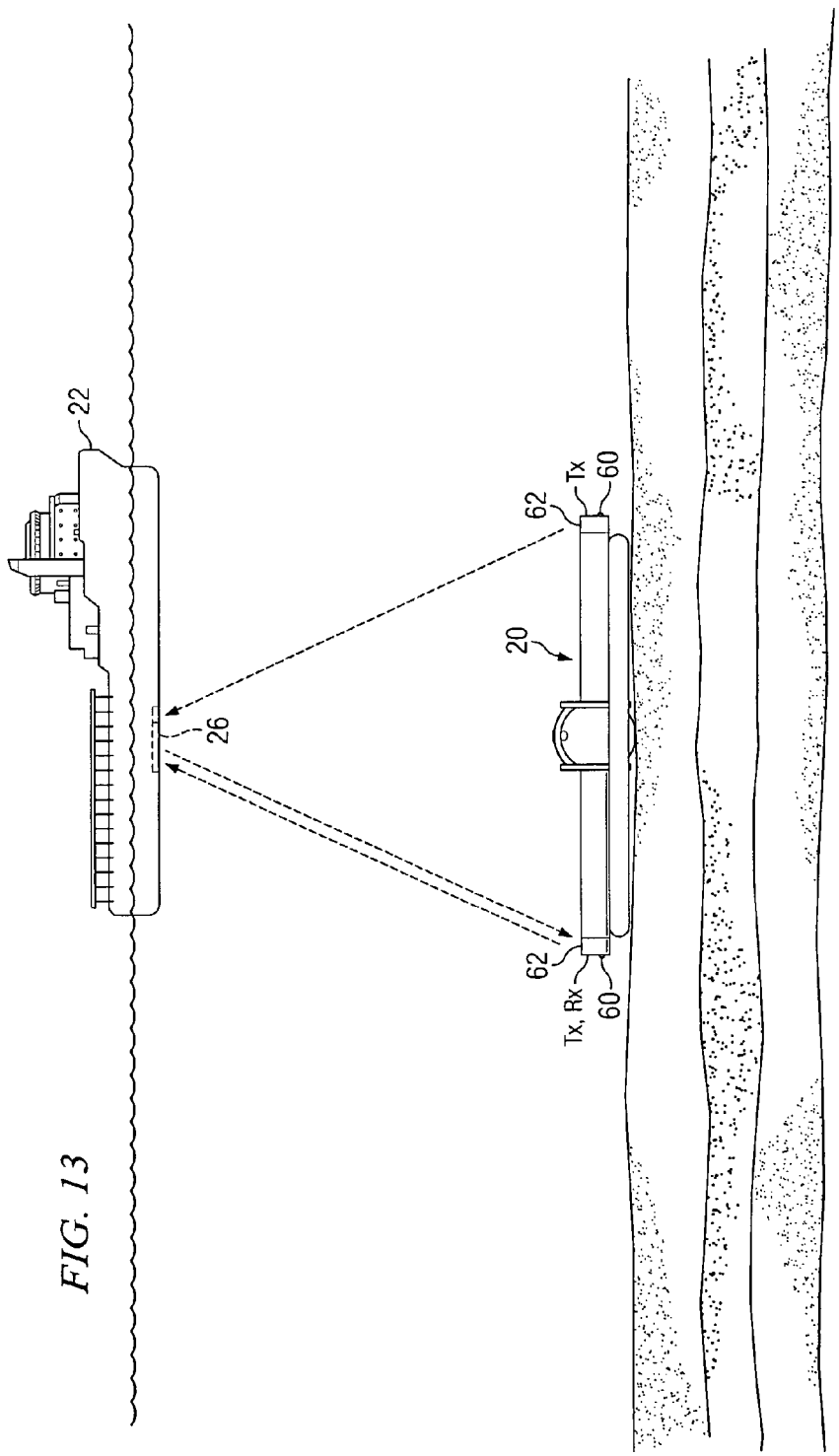
FIG. 13 is a schematic view depicting one embodiment of communication between a seafloor recorder instrument and an acoustic array displaced from the seafloor recorder instrument.

Referring to FIG. 13, the acoustic array 26 communicates with the instrument 20 by sending acoustic signals, which are received by one of the transponders 62 of the instrument 20. For purposes of clarity, the instrument 20 is enlarged in FIG. 13 relative to the vessel 22. In the illustrated embodiment, the transponder 62 disposed in the left end cap 60 operates as the trigger transponder, which is enabled upon receiving an acoustic signal from the acoustic array 26. In practice, the transponder elements 100, 102 of the acoustic array 26 generally transmit acoustic signals at a set frequency determined for particular water depth operations. For example, 40 MHz transmissions may be used for deep applications (e.g. deeper than 1000 m), while 80 MHz transmissions may be used for shallower, or continental shelf, operations. Once the left transponder 62 is triggered, the left and right transponders 62 begin to function as "slave" pingers, thereby transmitting acoustic signals back to the acoustic array 26 for a fixed period of time. In practice, the acoustics controller 70 (FIG. 8) interfaces with the transponders 62 to "fire" the ceramics to facilitate an accurate determination of location (in the x, y and z planes) of the instrument 20. The provision of two separate reference points (e.g. the left and right transponders 62 as viewed in FIG. 13) of positioning data aids the determination of the orientation of the instrument 20.

Onboard control software, which will be further described, conditions the received data to determine the x, y and z coordinates of the instrument 20 relative to the x, y and z coordinates of the acoustic array 26. The x, y and z coordinates of the acoustic array 26, in turn, are known relative to a geographic reference, such as true north, via a global positioning system (GPS) gyroscope (not shown) onboard the control vessel 22. Of course, other suitable instruments may be used to determine the orientation of the acoustic array 26 relative to a geographic reference. Using this data, the x, y and z coordinates of the instrument 20, and therefore the orientation of the instrument, can be determined relative to a geographic reference, such as true north. In practice, acoustic determinations of instrument orientation according to the present disclosure have been found to be accurate to better than 1.0 degree. Consequently, seismic data acquired under this methodology has been found to be highly accurate, and therefore, highly reliable in modeling geological formations lying beneath the seafloor 34. Moreover, the acoustic methodology of the present disclosure eliminates the costly and inefficient use of ROVs in instrument orientation determinations.

Figure 14:
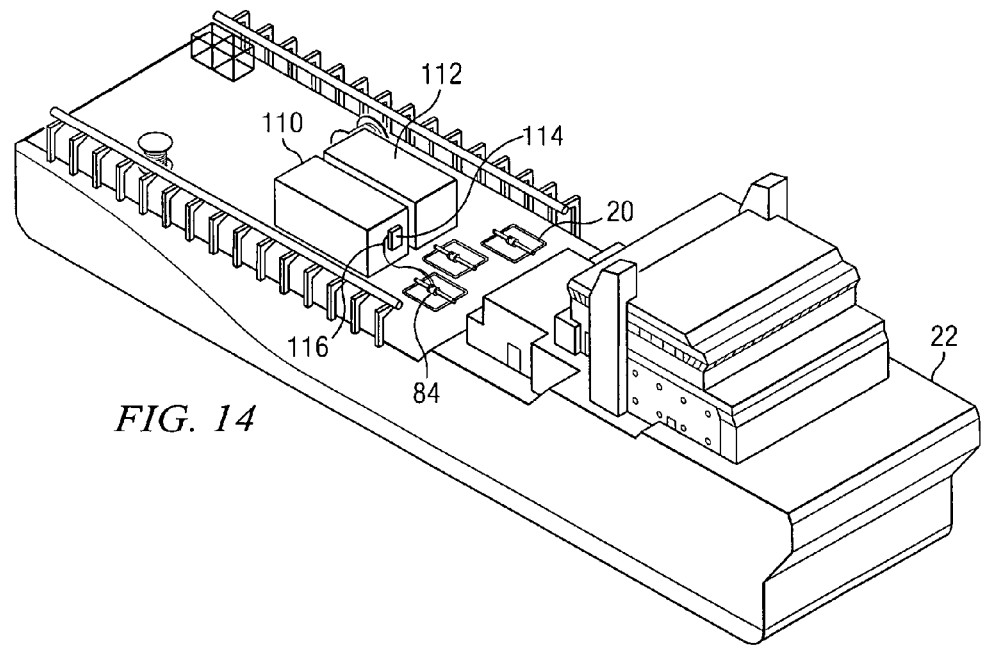
FIG. 14 is an isometric view of one embodiment of a control vessel having an on-board system for acquiring seismic data.

Referring to FIG. 14, the control vessel 22 may include a recording compartment 110 (similar to recording compartment 28 in FIG. 2) and a navigational compartment 112 for generally facilitating the acquisition of seismic data. In one aspect, the recording and navigational compartments 110, 112 comprise various hardware components and associated software modules for receiving and conditioning the recorded seismic data and for generally integrating and controlling various system devices, such as the instruments 20, the acoustic array 26 and the pneumatic air gun assembly 46. The recording compartment 110 includes a docking station 114 having a receiving port 116, which is adapted to connect to the data ports 84 of the individual instruments 20.

Figure 15:
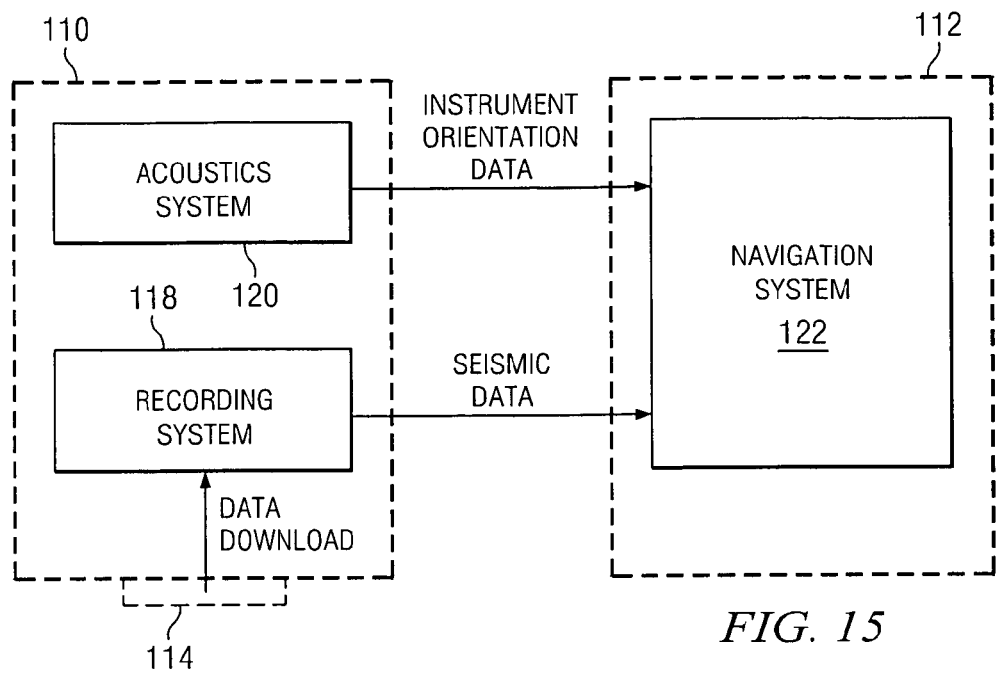
FIG. 15 is a schematic depiction of one embodiment of various systems usable during a seismic data acquisition process.

In practice, and with reference to FIG. 15, the recorded seismic data is downloaded from the solid-state memory disks in the instrument 20 to a recording system 118 within the recording compartment 110. The downloading may take place via an Ethernet connection facilitated by the data port connection. The recording system 118 may include facilities for archiving the seismic data prior to transferring the data to the navigational compartment 112 for conditioning. The battery packs 65 within the instrument 20 may also be recharged while connected to the docking station 114. The recording shack 110 further includes an acoustics system 120, which is configured to receive the instrument orientation data from the acoustic array 26. The acoustics systems 120 transfers the instrument orientation data to the navigational shack 112 where it is merged with the downloaded seismic data as will be further described.

Various other processes may be carried out via the acoustics system 120. For example, the acoustic communication link between the control vessel 22 and the seafloor instruments 20 can be used to control the operating modes of the seafloor instruments. In this regard, this acoustic link can be used to switch the recorder 68 of the instrument 20 into a hibernate mode, thereby dropping current consumption and conserving energy. This facility may be particularly utilized during downtime or standby periods when no recording is possible or required. In a similar manner, the acoustics system 120 can "wake up" the recorder 68 and return it to a production, or recording, mode. Data can also be transferred via this link to perform basic quality assurance and system status functions. For example, the acoustics system 120 can be utilized to check the internal temperature of the instrument housing 58, the battery voltage levels within the instrument 20 and the general functionality of various instrument devices and elements. A unique identification number assigned to each seafloor instrument 20 facilitates this quality assurance functionality, thereby allowing targeted or selective applications. The identification number may be stored within the acoustics electronics inside the instrument housing 58, and may also be duplicated in the RFID tag 71. Still further, the identification number may be physically written onto the outer casing of the instrument 20 to permit visual confirmation when the instruments are retrieved from the seafloor 34.

The navigational compartment 112 includes a navigational system 122, which receives data from the recording system 118 and the acoustics system 120 and merges and conditions this data to yield the ultimate seismic data. In one aspect, the navigation system 122 includes software for controlling the firing of the pneumatic air guns of the pneumatic air gun assembly. Accordingly, the navigational system 122 is able to time-stamp each firing event and correlate the registered time to the seismic data received from the recording system 118. In this sense, the source-firing events are synchronized with the seismic data in the integrated navigational system 122. The navigational system 122 conditions the seismic data by first de-skewing the data to account for any internal clock drift, then extracting the data by correlation to the source fire time, and rotating the measured seismic data according to the heading, tilt and geophone orientation. Also, the navigational system 122 may carry out various quality control measures to ensure the accuracy of the seismic data. In this regard, the navigational system 122 can verify that the data record is complete (e.g. by evaluating whether the volume of data corresponds to the duration of recording) and that the data quality is readable.

The navigational system 122 may include an internal database, which receives and archives the conditioned seismic data. Provision of the internal database eliminates the need for real-time write to tape operations. At this point, the seismic data may be stored, processed, or shipped elsewhere for storage and processing. The seismic data may be processed to create 3-D images of the reservoir and associated geological formations, thereby enabling more accurate and efficient drilling of the reservoir.

Figure 16:
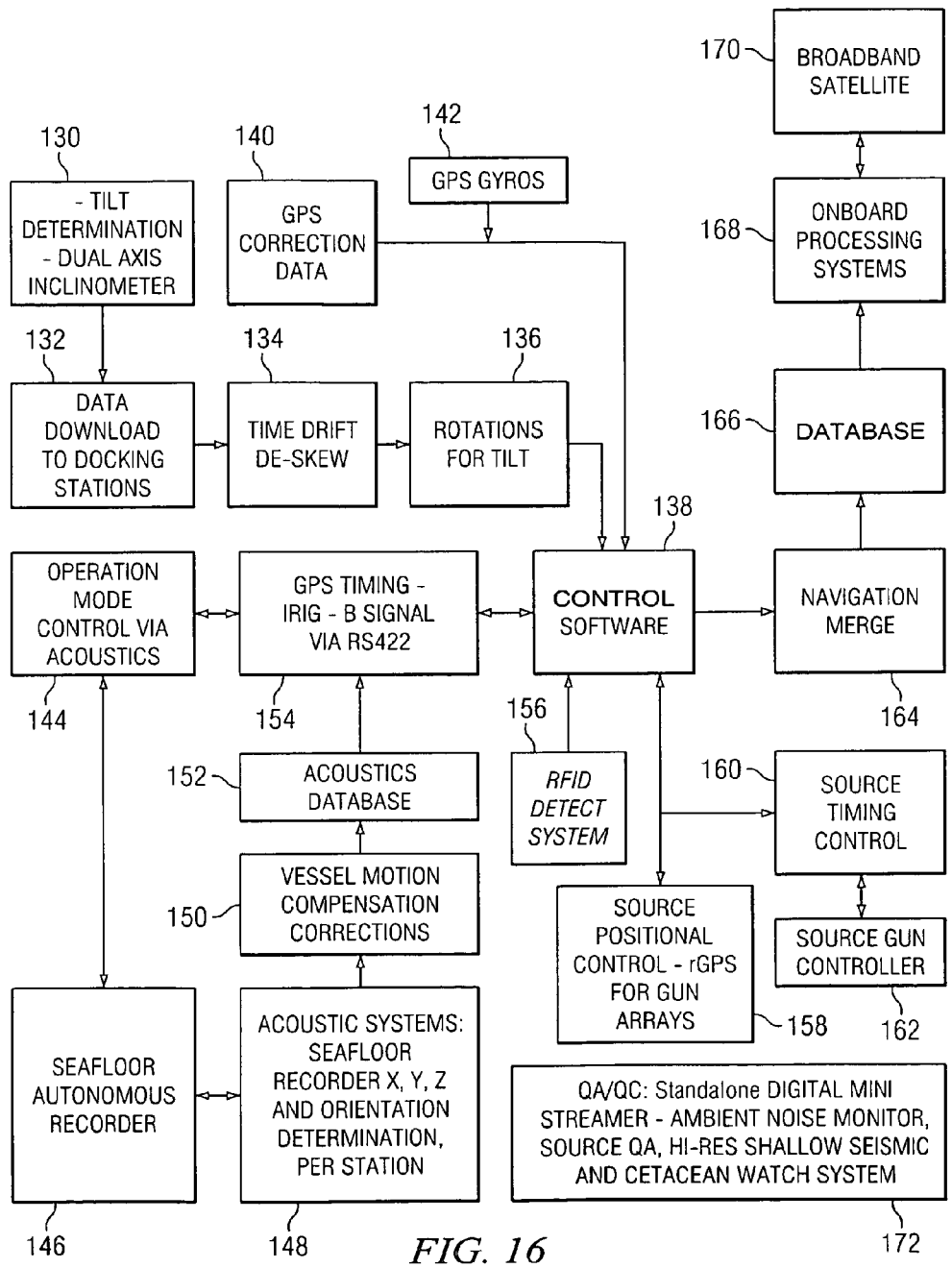
FIG. 16 is a block diagram detailing various sub-systems and methodology associated with one embodiment of the systems depicted in FIG. 15.

FIG. 16 details various exemplary system components and methodology associated with the on-board data conditioning system, including the recording and navigational compartments 110, 112. For example, data flow associated with the recording system 118 may include tilt determinations 130 and seismic data for each of the seafloor instruments 20. The tilt determinations 130 along with the recorded seismic data are then downloaded 132 to the docking stations onboard the control vessel. Time drift de-skew operations 134 are carried out and the seismic data is appropriately modified according to tilt 136 before being conditioned by control software 138. Also, GPS correction and gyroscope data 140, 142, respectively, are also fed into the control software 138. Moreover, data flow associated with the acoustics system 120 generally includes operation mode control 144 of the instrument acoustics 146 as well as orientation determinations 148 and control vessel motion compensation corrections 150, which are fed into an acoustics database 152. Timing signal corrections 154 may also be implemented. Acoustics data is also fed into the control software 138 and conditioned along with the seismic data. An RFID detect system 156 may be used to associate data to particular instruments.

The control software 138 may be used to control the positioning 158, timing 160 and firing 162 of the pneumatic gun arrays. The control software 138 may additionally facilitate data merge 164 for conditioning the seismic data for use. The conditioned seismic data may then be stored in a navigational database 166 and further processed onboard 168 before being exported elsewhere 170. An additional standalone digital streamer 172 may be provided for accomplishing additional tasks, such as monitoring noise and generally providing real time quality assurance.

Figure 17:
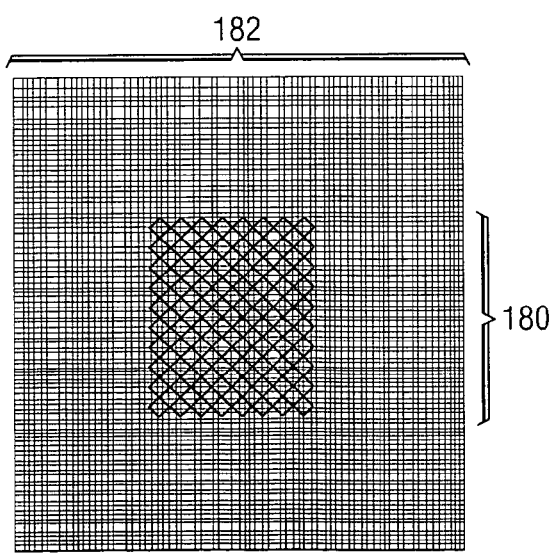
FIG. 17 is a schematic depiction of an exemplary instrument deployment pattern, which can be used for acquiring seismic data for the full azimuth of a geological formation.

The quality and accuracy of the seismic data acquired according to the principles of the present disclosure are further enhanced by the ability to efficiently deploy the instrument lines 30 to the seafloor 34. Referring to FIG. 17, the instrument lines can be deployed to create a grid-like pattern 180 of instruments. In one exemplary embodiment, twenty instrument lines each having 25-40 instruments may be deployed to provide a large "footprint" (e.g. 12 to 20 square miles) from which to gather seismic data. The spacing between instruments 20 and instrument lines 30 may vary according to the particular needs of the application. Additionally, the number of instruments 20 and instrument lines 30 may also vary. The grid-like pattern 180, in turn, yields a large swath of seismic data for a particular seafloor region. During and after deployment, the source vessel (not shown) may fire the pneumatic air guns in an area 182 generally concentric with the area defined by the grid-like pattern 180. In this manner, the seismic data recorded by the instruments 20 can yield a full-azimuth, true three-dimensional (3D) view of the geological formations lying beneath the seafloor 34. Moreover, as additional instrument lines 30 are being deployed, other instrument lines may be retrieved, thereby allowing a continually moving footprint of seismic data. Consequently, seismic data can be acquired more efficiently through use of the disclosed seismic systems and methodology in comparison to current OBS systems, which require time-consuming ROVs to determine the orientation of the recorders on the seafloor. As can be appreciated, the use of ROVs limits the number of deployed recorders due to the amount of time needed to deploy and manipulate the ROV in determining instrument orientation of each deployed instrument. In contrast, the systems and methods of the present disclosure eliminate the expensive and inefficient ROV determination process by providing for the determination of instrument orientation discretely via acoustic communication between the instrument 20 and the acoustic array 26 (FIG. 2). Quick orientation determinations translate into quick deployment, which in turn, allows deployment of a large number of instruments 20.

While various embodiments of seismic data acquisition systems and associated seismic data instruments according to the principles disclosed herein, and related methods of acquiring seismic data, have been described above, it should be understood that they have been presented by way of example only, and not limitation. For example, although the left transponder 62 is described as the trigger transponder in the foregoing description, it is to be understood that either the left or right transponder 62 may function as the trigger transponder. In embodiments where more than two transponders 62 are used, any one of the transponders may function as the trigger transponder. Thus, the breadth and scope of the invention(s) should not be limited by any of the above-described exemplary embodiments, but should be defined only in accordance with the following claims and their equivalents. Moreover, the above advantages and features are provided in described embodiments, but shall not limit the application of the claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in the claims found herein. Furthermore, any reference in this disclosure to "invention" in the singular should not be used to argue that there is only a single point of novelty claimed in this disclosure. Multiple inventions may be set forth according to the limitations of the multiple claims associated with this disclosure, and the claims accordingly define the invention(s), and their equivalents, that are protected thereby. In all instances, the scope of the claims shall be considered on their own merits in light of the specification, but should not be constrained by the headings set forth herein.

What is claimed is:

1. A method for acquiring seismic data, comprising:
    deploying a plurality of instruments, each instrument having sensors for acquiring seismic data and being adapted for contact with the seafloor, and each instrument further having at least two transponders;
    providing an acoustic array spaced apart from the plurality of instruments when the instruments are in contact with the seafloor;
    determining a geographical orientation of at least one of the instruments on the seafloor, whereby the orientation is determined by sending acoustic signals from the acoustic array to at least one of the transponders and receiving acoustic signals from the two transponders; and acquiring seismic data via the sensors.

2. A method according to claim 1, wherein determining a geographical orientation further comprises determining an orientation of the instrument relative to the acoustic array and determining an orientation of the acoustic array relative to a geographic reference.

3. A method according to claim 2, wherein the orientation of the acoustic array relative to the geographic reference is determined by comparison with a GPS gyroscope.

4. A method according to claim 2, wherein the orientation of the instrument relative to the geographic reference is determined by comparing the orientation of the acoustic array with the geographic reference and by comparing the orientation of the instrument with the acoustic array.

5. A method according to claim 2, wherein the geographic reference is true north.

6. A method according to claim 1, wherein deploying a plurality of instruments comprises deploying a series of instruments from a sea vessel into the sea, the instruments of each series of instruments being operatively connected to one another via a tether line.

7. A method according to claim 6, wherein each series of instruments includes a pair of release transponders disposed at opposing ends of the tether line.

8. A method according to claim 7, further comprising retrieving each series of instruments by sending an acoustic signal to a first of the release transponders to dispatch the release transponder from the seafloor to the sea surface.

9. A method according to claim 8, further comprising operatively engaging a portion of the tether line adjacent to the release transponder and retrieving each of the series of instruments onto the vessel.

10. A method according to claim 2, wherein acquiring seismic data comprises measuring seismic data with a plurality of sensors disposed within the instrument.

11. A method according to claim 10, wherein the plurality of sensors comprise three geophones for recording P-wave data and S-wave data and one hydrophone for recording P-wave data.

12. A method according to claim 11, wherein the three geophones are disposed in a Galperin arrangement within the instrument and the hydrophone is disposed within the instrument yet in communication with seawater.

13. A method according to claim 10, wherein measuring the seismic data comprises generating analog seismic data, digitizing the analog seismic data, and recording the digitized seismic data.

14. A method according to claim 13, wherein the digitized seismic data is transferred to a storage device disposed within the instrument.

15. A method according to claim 14, further comprising retrieving the digitized seismic data through a data port of the instrument.

16. A method according to claim 1, wherein acquiring seismic data comprises recording seismic data via sensors disposed within the instrument and retrieving the seismic data through a data port of the instrument.

17. A method according to claim 1, wherein determining a geographical orientation of at least one of the instruments further comprises determining the tilt of at least one instrument in two axes with an inclinometer disposed within the instrument, the tilt being used for subsequent re-orientation of the instrument relative to a horizontal plane.

18. A system for acquiring seismic data, comprising:

a plurality of deployable instruments having sensors for acquiring seismic data, each of the instruments comprising an instrument housing disposed on a lifting frame, the instrument housing being generally elongated and including a pair of tubular portions and a central portion in communication with one another, whereby a first transponder is disposed at a first end of the instrument housing and a second transponder is disposed at a second end of the instrument housing, the instrument housing further having an acoustics controller disposed therein;

an acoustic array spaced apart from the instruments when the instruments are deployed, the acoustic array being operable for determining an orientation of at least one of the plurality of instruments relative to a geographic reference, whereby the acoustics controller facilitates acoustic communication between the instrument and the acoustic array; and a data conditioning system for retrieving the seismic data from the instruments and conditioning the seismic data from the at least one of the plurality of instruments according to the orientation of the at least one of the plurality of instruments.

19. A system according to claim 18, wherein the acoustic array is disposed within the hull of a sea vessel.

20. A system according to claim 18, wherein the acoustic array is operatively connected to a sea vessel.

21. A system according to claim 18, wherein the acoustic array comprises a plurality of transmitter elements and receiver elements arranged in an orthogonal shape.

22. A system according to claim 18, wherein the data conditioning system is disposed on a sea vessel.

23. A system according to claim 22, wherein the data conditioning system includes an acoustics system for receiving instrument orientation data from the acoustic array, a recording system for receiving seismic data from the instruments, and a navigational system for receiving the seismic data and conditioning the seismic data according to the instrument orientation data.

24. A system according to claim 18, wherein the lifting frame has a substantially rectilinear shape.

25. A system according to claim 18, wherein the central portion includes a plurality of seismic sensors for acquiring P-wave and S-wave data.

26. A system according to claim 18, wherein one of the tubular portions includes a recorder device for recording the P-wave and S-wave data acquired by the seismic sensors.

* * * * *